US 9,496,972 B2

(12) United States Patent
Wu

(10) Patent No.: US 9,496,972 B2
(45) Date of Patent: Nov. 15, 2016

(54) COMMUNICATION DEVICES AND METHODS THEREOF

(75) Inventor: Chih-Hsiang Wu, Taoyuan County (TW)

(73) Assignee: HTC Corporation, Taoyuan (TW)

(*) Notice: Subject to any disclaimer, the term of this patent is extended or adjusted under 35 U.S.C. 154(b) by 251 days.

(21) Appl. No.: 13/040,725

(22) Filed: Mar. 4, 2011

(65) Prior Publication Data

US 2011/0216686 A1 Sep. 8, 2011

Related U.S. Application Data

(60) Provisional application No. 61/311,558, filed on Mar. 8, 2010.

(51) Int. Cl.
*H04L 5/14* (2006.01)
*H04B 7/00* (2006.01)
*H04J 3/00* (2006.01)
*H04H 20/71* (2008.01)

(52) U.S. Cl.
CPC .................. *H04H 20/71* (2013.01)

(58) Field of Classification Search
CPC ........... H04L 20/71; H04L 5/14; H04L 5/003; H04W 84/18; H04W 84/12; H04W 72/04
USPC ........................................ 709/231
See application file for complete search history.

(56) References Cited

U.S. PATENT DOCUMENTS

| 8,473,984 | B1* | 6/2013 | Harmon | H04L 65/1083 |
| | | | | 370/310 |
| 8,526,300 | B2* | 9/2013 | Arberg | H04L 12/185 |
| | | | | 370/225 |
| 2007/0189289 | A1* | 8/2007 | Frederiksen | H04L 5/023 |
| 2008/0207151 | A1* | 8/2008 | Rinne et al. | 455/140 |
| 2008/0311892 | A1* | 12/2008 | Lee | H04W 72/005 |
| | | | | 455/414.1 |

(Continued)

FOREIGN PATENT DOCUMENTS

| JP | 2008-501281 A | 1/2008 |
| JP | 2010-502054 A | 1/2010 |

(Continued)

OTHER PUBLICATIONS

3GPP TS 36.331 V9.0.0 (Sep. 2009) $3^{rd}$ Generation Partnership Project; Techniucal Specification Group Radio Access Network; Evolved Universial Terrestrial Radio Access(E-UTRA) Radio Ressource Control (RRC) protocol specification (Relaese 9).*

(Continued)

*Primary Examiner* — Faruk Hamza
*Assistant Examiner* — Abu-Sayeed Haque
(74) *Attorney, Agent, or Firm* — Birch, Stewart, Kolasch & Birch, LLP

(57) ABSTRACT

Communication devices and methods thereof. The communication device comprises a communication module and a control module. The communication module is configured to receive point-to-multipoint data and point-to-point data on a first carrier, and receives a configuration of a second carrier after configuring the first carrier. The control module, coupled to the communication module, configures the second carrier according to the received configuration.

12 Claims, 4 Drawing Sheets

(56) References Cited

U.S. PATENT DOCUMENTS

| | | | | |
|---|---|---|---|---|
| 2009/0197589 | A1* | 8/2009 | Kitazoe | H04W 76/045 455/422.1 |
| 2010/0080159 | A1 | 4/2010 | Hu et al. | |
| 2010/0124201 | A1* | 5/2010 | Griot | H04W 36/06 370/331 |
| 2010/0202382 | A1* | 8/2010 | Park et al. | 370/329 |
| 2011/0002281 | A1* | 1/2011 | Terry | H04W 52/0216 370/329 |
| 2011/0021197 | A1* | 1/2011 | Ngai | H04W 36/30 455/436 |
| 2011/0026450 | A1* | 2/2011 | Kuchibhotla | H04W 76/025 370/312 |
| 2011/0086662 | A1* | 4/2011 | Fong | H04W 72/0406 455/517 |
| 2011/0116467 | A1 | 5/2011 | Jung et al. | |
| 2012/0287902 | A1* | 11/2012 | Bufe | H04W 36/0055 370/331 |
| 2013/0324114 | A1* | 12/2013 | Raghothaman | H04W 76/023 455/426.1 |
| 2014/0087735 | A1* | 3/2014 | Vikberg | H04W 36/0055 455/436 |

FOREIGN PATENT DOCUMENTS

| | | |
|---|---|---|
| JP | 2010-518731 A | 5/2010 |
| JP | 2010-530662 A | 9/2010 |
| JP | 2011-528212 A | 11/2011 |
| KR | 10-2008-0019160 A | 3/2008 |
| KR | 10-2008-0053008 A | 6/2008 |
| TW | 200423657 A | 11/2004 |
| TW | 200847815 A | 12/2008 |
| WO | WO 2006/102746 A1 | 10/2006 |
| WO | WO 2008/100116 A1 | 8/2008 |
| WO | WO 2008/151069 A1 | 12/2008 |
| WO | WO 2008/153302 A2 | 12/2008 |
| WO | WO 2009/035280 A2 | 3/2009 |
| WO | WO 2010/008228 A2 | 1/2010 |

OTHER PUBLICATIONS

ETSI TS 136 330 V8.9.0 (Jul. 2009); LTE; Evolved Universal Terrestrial Radio Access (E-UTRA) and Evolved Universal Terrestrial Radio Access Network (E-UTRAN); Overall description; Stage 2 (3GPP TS 36.300 version 8.9.0 Release 8) pp. 1-163.

3GPP TSG-RAN WG2 Meeting #69; San Francisco, U.S.A., Feb. 22-26, 2010; pp. 1-17.

ETSI TS 136 331 V9.1.0 (Feb. 2010); LTE; Evolved Universal Terrestrial Radio Access (E-UTRA); Radio Resource Control (RRC); Protocol specification (3GPP TS 36.331 version 9.1.0 Release 9) pp. 1-234.

3GPP TS 36.331 V9.0.0 (Sep. 2009); 3rd Generation Partnership Project; Technical Specification Group Radio Access Network; Evolved Universal Terrestrial Radio Access (E-UTRA) Radio Resource Control (RRC); Protocol specification (Release 9); 213 pages.

* cited by examiner

COMMUNICATION DEVICES AND METHODS THEREOF

CROSS REFERENCE TO RELATED APPLICATIONS

This application claims the benefit of U.S. Provisional Application No. 61/311,558, filed on Mar. 8, 2010, the entirety of which is incorporated by reference herein.

BACKGROUND OF THE INVENTION

1. Field of the Invention

The disclosure relates generally to data transmission with multiple carriers, and, more particularly to communication devices capable of providing multimedia broadcast/multicast service (MBMS) and unicast services with multiple carriers and methods thereof.

2. Description of the Related Art

In many communication systems, receivers may receive unicast, broadcast, or multicast data transmissions. For example, Multimedia Broadcast and Multicast Service (MBMS) is a service in which base stations transmit information of general interest on a commonly used channel, so that mobile devices that subscribe to the service can access the MBMS channels to obtain a service of interest, such as daily news or baseball game scores.

A Long Term Evolution (LTE) system is an evolved next-generation wireless communication system proposed by the Third Generation Partnership Project (3GPP). The LTE system provides high-speed low-latency packet-based communication at a data rate of up to 100 Mbps. The LTE system includes an Evolved Universal Terrestrial Radio Access Network (EUTRAN) having a plurality of evolved Node-Bs (eNBs), which communicate wirelessly with a plurality of user equipment (UEs) though uplink and downlink radio channels.

The LTE system employs multiple component carriers and carrier aggregation, where multiple component carriers are aggregated to transmit data between eNBs and UEs. However, using multiple component carriers and carrier aggregation increases complexity of providing unicast and broadcast services to the UEs. Thus, communication devices and methods thereof capable of providing MBMS and unicast services with multiple carriers are called for.

BRIEF SUMMARY OF THE INVENTION

An embodiment of a method in a communication device is disclosed, comprising a communication device configuring to receive point-to-multipoint data and point-to-point data on a first carrier, where the communication device receives a configuration of a second carrier after configuring the first carrier.

Another method of a communication device is provided, comprising a communication device receiving point-to-multipoint data on a first carrier and a second carrier.

Yet another embodiment of a method in a communication device is shown, comprising a communication device receiving point-to-multipoint data on a first carrier, where the communication device receives and point-to-point data from a second carrier.

Still another embodiment of a communication device is provided, comprising a communication module and a control module. The communication module is configured to receive point-to-multipoint data and point-to-point data on a first carrier, and receives a configuration of a second carrier after configuring the first carrier. The control module, coupled to the communication module, configures the second carrier according to the received configuration.

Still yet another embodiment of a communication device is provided, comprising a communication module and a control module. The communication module receives point-to-multipoint data on a first carrier and a second carrier. The control module, coupled to the communication module, processes the point-to-multipoint data for playback.

Yet another embodiment of a communication device is disclosed, comprising a communication module. The communication module receives point-to-multipoint data on a first carrier, and receives and point-to-point data from a second carrier.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
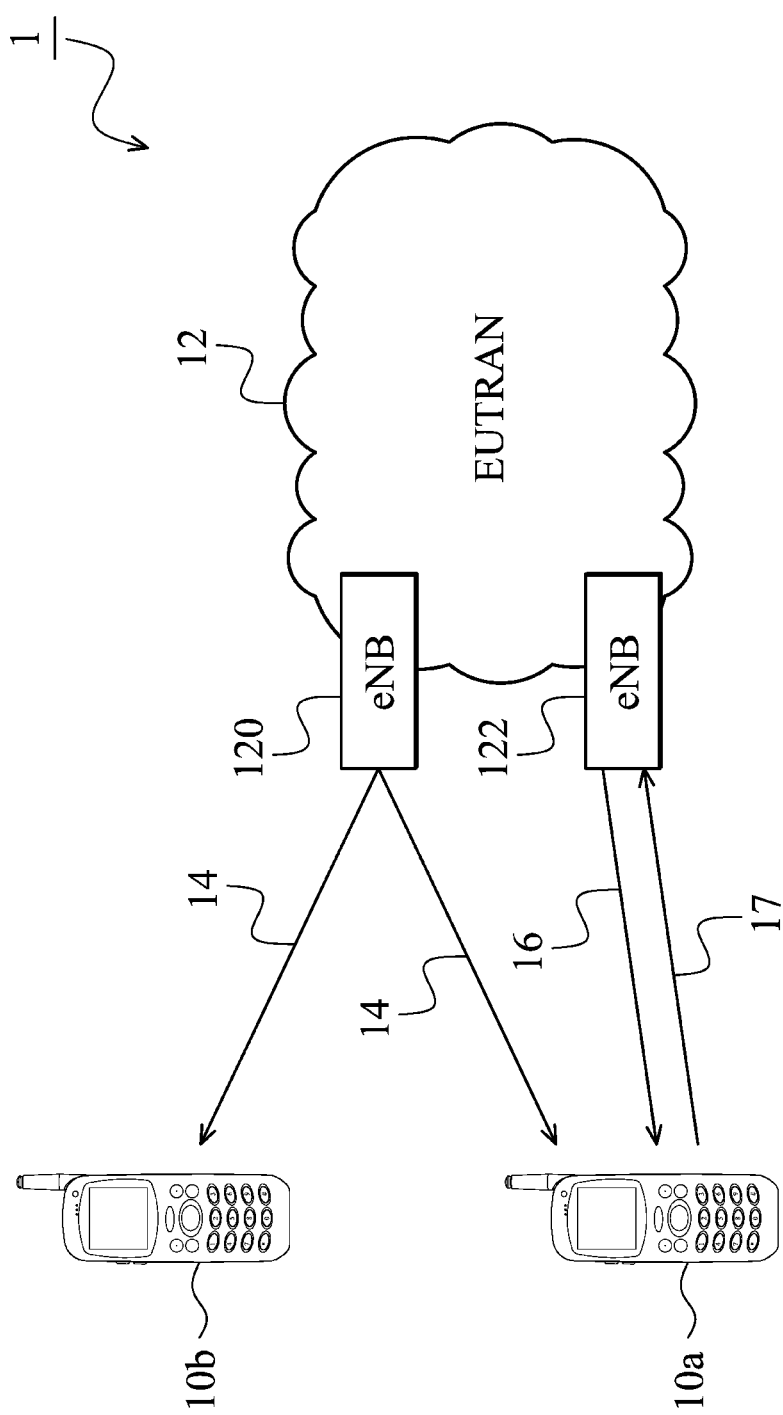
FIG. 1 is a block diagram of an exemplary wireless communication system 1, incorporating a communication device 10a in accordance with the present invention.

FIG. 1 is a block diagram of an exemplary wireless communication system 1, incorporating a communication device 10a in accordance with the present invention. The communication system 1 is an LTE system comprising the communication device 10a, a communication device 10b, and an Evolved Universal Terrestrial Radio Access Network EUTRAN 12. In the LTE system, a plurality of cells 120 and 122 belonging to a same eNB or different eNBs in the EUTRAN 12 communicate with a plurality of remote UEs through uplink and downlink radio channels, where the uplink and downlink data communication may be carried out on a plurality of component carriers.

The cells 120 and 122 are the radio access ports of the LTE system. Each cell comprises at least one radio transmitter, receiver, control section and power supply. Each cell comprises an antenna system, e.g., a radio tower, building, and base station. The base station radio equipment includes transceivers and antenna interface equipment, the controllers, and power supplies. The cell 120 provides point-to-multipoint data services such as Broadcast/Multicast Service in 3GPP2, Multimedia Broadcast/Multicast Service in 3GPP, or other broadcasting technologies, where data is transmitted to multiple network recipients concurrently. The cell 122 provides point-to-point data services such as voice, multimedia, messaging, application data, and other unicast services, where data is transmitted to a single network destination identified by a unique network address. For purposes of explanation, the cell 120 only provides the point-to-multiple data service and the cell 122 only provides the point-point data service. However, the cells 120 and 122 may support the point-to-multipoint data service and the point-to-point data service concurrently as a choice of a network design preference.

The communication devices 10a and 10b are any devices used directly by an end-user for communications, e.g., handhold mobile phones, laptops equipped with broadband network adaptors, or any other device capable of communications. The communication devices 10a are capable of receiving the point-to-multipoint data service and the point-to-point data service concurrently on multiple carrier signals, and aggregating several carrier signals to increase bandwidth of data transmission up to 100 MHz, which is referred to as Carrier Aggregation (CA). The carrier signals are referred to as Component carriers (CC) in the LTE technology. The communication modules 10a and 10b each comprise a baseband module (not shown) and a radio frequency (RF) module (not shown). The baseband module may comprise hardware to perform baseband signal processing including digital signal processing, coding and decoding, and so on. The RF module may comprise hardware to perform analog to digital conversion (ADC), digital to analog conversion (DAC), gain adjusting, modulation, demodulation, and so on. The RF module may receive RF signals from the cells 120 and 122 and down-convert the received RF wireless signals to baseband signals to be processed by the baseband unit, or receive baseband signals from the baseband unit and up-convert the received baseband signals to RF wireless signals for uplink transmission. The RF module may comprise a mixer to up-convert the baseband signals with a component carrier signal oscillated at a radio frequency of the wireless communications system. The radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. The communication device 10a receives the downlink point-to-multipoint or point-to-point data on one or more component carrier.

In the LTE system, the logical connection between the communication device 10a and the cell 120 is determined by the radio resource control (RRC) connection status. In the RRC idle mode, the communication device 10a has no RRC connection to the cell 120, and can establish an RRC connection therebetween to enter the RRC connected mode. After the RRC connection is established or re-established, the component carrier corresponding to the cell 120 is referred to as the Downlink Primary Component Carrier (DL PCC). There is always only one downlink PCC and one uplink PCC configured for each communication device in the RRC connected mode. After the RRC connection establishment the carrier aggregation is applied to the communication device 10a, multiple component carriers are configured to provide connections between the communication device 10a and EUTRAN 12. Component carriers other than the PCC are referred to as Secondary Component Carriers (SCCs). The uplink (UL) PCC is used for transmission of Layer 1 uplink control information. The DL PCC cannot be de-activated. RCC re-establishment is triggered when the DL PCC experiences radio link failure (RLF), not when the DL SCCs experience RLF. The DL PCC cell can be changed with a handover procedure, i.e. with a key change and Random Access Channel (RACH), and possible optimization. Non-Access Stratum (NAS) information is taken from the DL PCC cell. With reconfiguration, the addition and removal of CCs can be performed by RRC signaling. When intra-LTE handover is performed, RRC signaling can also add, remove, or reconfigure CCs for usage in the target cell. When adding a new CC, dedicated RRC signaling is used for sending system information of the CC, which is necessary for CC transmission and reception.

Figure 2:
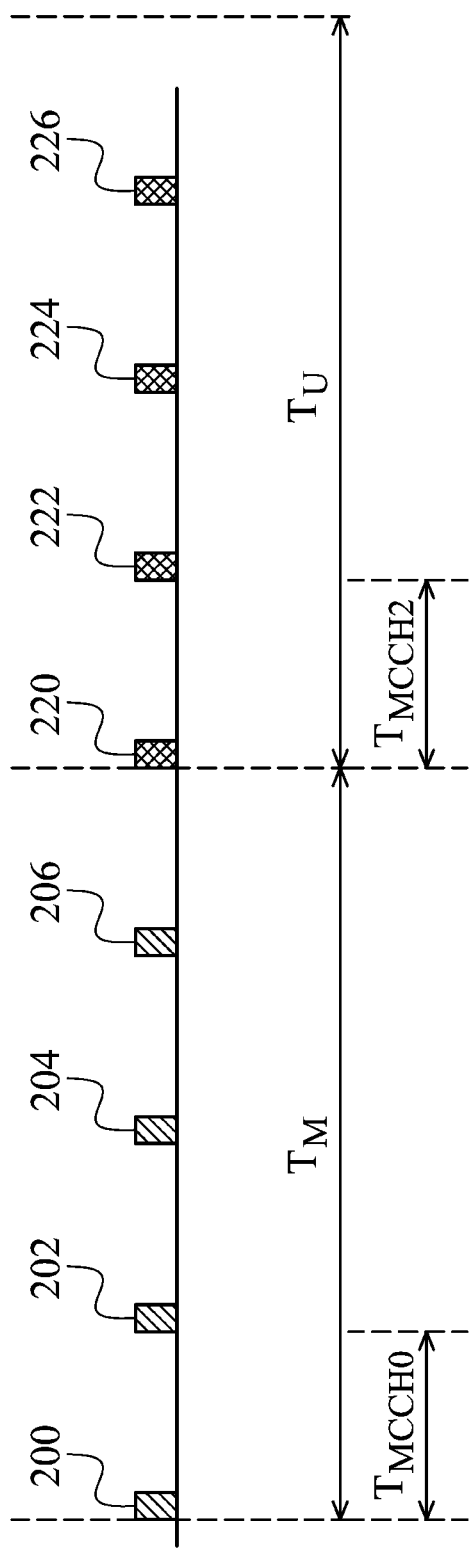
FIG. 2 depicts a timing diagram of the MBMS control information in the MCCH according to the 3GPP specification.

The MBMS capable cell 122 may belong to a Multimedia Broadcast Single Frequency Network (MBSFN), where multiple eNBs are synchronized to broadcast MBMS data over the air in a single frequency, so that a communication device within the coverage of the MBSFN can treat the multi-cell broadcast transmission in the same way as a single large eNB broadcast transmission, with effects of multipath. Prior to acquiring the MBMS from the MBSFN, the communication devices 10a and 10b obtain limited MBMS control information on a Broadcast Control Channel (BCCH) to configure a Multicast Control Channel (MCCH), which carries MBMS control information that the communication device can use to obtain the MBMS in a Multicast Transport Channel (MTCH). The limited MBMS control information on the BCCH is defined in the SystemInformationBlockType13. The MBMS control information is broadcasted in the MBSFN periodically using a configurable repetition period defined in the SystemInformationBlockType13. FIG. 2 depicts a timing diagram of the MBMS control information in the MCCH according to the 3GPP specification. The MBMS control information is broadcasted in the MBSFN every MCCH period $T_{MCCH0}$, which is subjected to change by the SystemInformationBlockType13. When a change of the MBMS control information in the MCCH occurs, the same information 200, 202, 204, and 206 are transmitted, a number of times, in a modification period $T_M$, which is also defined in the SystemInformationBlockType13, before the updated control information 220, 222, 224, and 226 are broadcasted in the network. In the modification period $T_M$, the communication devices 10a and 10b acquire an MBMS specific Radio Network Temporary Identifier (RNTI), or M-RNTI which notifies MCCH information changes that comprise a repetition coefficient, a radio frame offset, and a notification subframe in an 8-bit bitmap data. The communication devices interested in receiving the MBMS can acquire the updated control information 220, 222, 224, and 226 upon start of an updated period $T_U$ according to the MCCH information change notification, thereby obtaining the MBMS data. The communication devices that are not interested in receiving the MBMS can acquire the repetition coefficient notification RepetitionCoeff in the MCCH information change notification, to obtain the updated control information when requiring the MBMS. The EUTRAN 12 periodically provides Dynamic Scheduling Information (DSI) at the Media Access Control (MAC) layer to indicate the MBMS service of the sub-frames in the MTCH, so that the communication devices 10a and 10b can determine and retrieve an MBMS service of interest accordingly.

Referring to FIG. 1, the communication device 10a establishes an RRC connection with the cell 122, rendering a DL PCC 16 to provide downlink unicast services and an UL PCC 17 to provide uplink unicast services. Concurrently, the communication device 10a acquires the SystemInformationBlockType13 configuring the MCCH and obtains the MBMS control information, thereby allowing the communication device to retrieve the MBMS data of interests via a component carrier 14. The MBMS control information and the MBMS data are broadcasted by the cell 120 or cells (not shown) of an MBSFN. The component carriers 14 and 16 may be identical or different.

Figure 3:
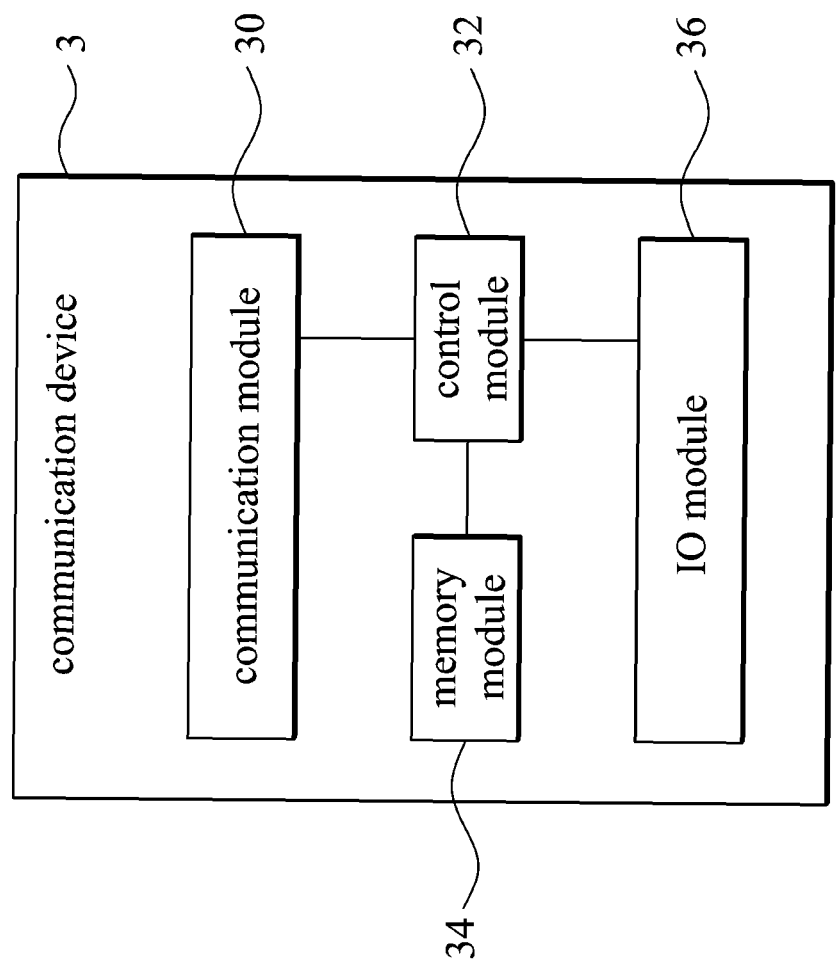
FIG. 3 is a block diagram of an exemplary communication device 3 according to the invention.

Referring to FIG. 3, FIG. 3 illustrates a block diagram of an exemplary communication device 3 according to the invention, incorporated as the communication device 10a in FIG. 1. The communication device 3 comprises a communication module 30, a control module 32, a memory module 34, and an IO module 36. The communication module 30, the memory module 34, and the IO module 36 are all coupled to the control module 32.

In one embodiment, the component carriers 14 and 16 are different. The communication module 30 comprises a radio transceiver transmitting to and receiving RF signals from the air. The communication module 30 receives point-to-multipoint data from the component carrier 14 (first carrier), and receives point-to-point data from the component carrier 16 (second carrier). The point-to-multipoint data may be MBMS data, and the point-to-point data may be unicast voice data. The communication module 30 receives the MBMS data of interest according to the DSI periodically broadcasted by the EUTRAN 12. The MBMS data and the unicast voice data may be stored in the memory module 34. The communication module 30 may receive control information of the MBMS data from the component carrier 14 or 16. The communication module 30 may also receive control information of the MBMS data from a point-to-point transmission dedicated thereto, e.g., from RRC signaling. The control information of the MBMS data comprises at least one of the SystemInformationBlockType13 on the BCCH and the MBMS control information on the MCCH. The MBMS data comprises at least one of MTCH data, MCCH data, dynamic scheduling information (DSI), and an MCCH change notification. The MCCH change notification is received over the physical downlink control channel (PDCCH) by the M-RNTI. The control module 32 configures the component carrier 14 according to the control information of the MBMS data, processes the MBMS data to play back the multimedia services through the IO module 36, and processes the unicast voice data to play back the phone call through the IO module 36. The playback operation comprises displaying text or image data on the IO module 26, or playing video or audio multimedia data. The IO module 36 may comprise a display screen, a touch screen, a speaker, a microphone, or a keyboard.

The present embodiment provides a communication device to retrieve unicast and broadcast services on separate component carriers, thereby reducing design complexity and signal interference.

In another embodiment, the component carriers 14 and 16 are identical, i.e., the point-to-multipoint data and the point-to-point data are timely multiplexed and transmitted over one DL PCC. For example, MBMS data is transmitted on predetermined subframes, with subframes 0, 4 and 5 in each 10 ms radio frame reserved for unicast transmission. The point-to-multipoint data may be MBMS data, and the point-to-point data is unicast voice data. The communication module 30 receives MBMS data and unicast voice data from the DL PCC (first carrier), and receives a configuration of the DL SCC (second carrier) when receiving the MBMS data and the unicast voice data. The MBMS data and the unicast voice data may be stored in the memory module 34. The control module 32 configures the second component carrier to be the primary component carrier according to the received configuration, processes the MBMS data to play back the multimedia services through the IO module 36, and processes the unicast voice data to play back the phone call through the IO module 36. The IO module 36 may comprise a display screen, a touch screen, a speaker, a microphone, or a keyboard. The communication module 30 receives the MBMS data only from the first component carrier. The communication module 30 may receive control information of the MBMS data only from the first component carrier, or from a dedicated RRC signaling message. The control information of the MBMS data comprises at least one of the SystemInformationBlockType13 on the BCCH and the MBMS control information on the MCCH. The MBMS data comprises at least one of MTCH data, MCCH data, DSI, and MCCH change notification. The MCCH change notification is received over the physical downlink control channel (PDCCH) by the M-RNTI.

The present embodiment provides a communication device, which retrieves unicast and broadcast services on separate component carriers, thereby reducing design complexity and signal interference.

In another embodiment, the component carriers 14 and 16 are identical, i.e., the point-to-multipoint data and the point-to-point data are timely multiplexed and transmitted over one DL PCC. The point-to-multipoint data may be MBMS data, and the point-to-point data is unicast voice data. The communication module 30 receives an MBMS data and unicast voice data from the DL PCC (first carrier), and receives a configuration of the DL SCC (second component carrier) when receiving the MBMS data and the unicast voice data. The MBMS data and the unicast voice data may be stored in the memory module 34. The control module 32 configures the second component carrier to be the primary component carrier according to the received configuration, processes the MBMS data to play back the multimedia services through the IO module 36, and processes the unicast voice data to play back the phone call through the IO module 36. The IO module 36 may comprise a display screen, a touch screen, a speaker, a microphone, or a keyboard. The communication module 30 then stops the reception of the MBMS data from the first component carrier and is limited to receive the MBMS data only from the newly configured primary component carrier, i.e., the second component carrier. Concurrently, the communication module can receive the unicast voice data from the first or the second component carriers. The communication module 30 may receive control information of the MBMS data only from the second component carrier, or from a point-to-point transmission dedicated thereto, e.g., from RRC signaling. The control information of the MBMS data comprises at least one of the SystemInformationBlockType13 on the BCCH and the MBMS control information on the MCCH. The MBMS data comprises at least one of MTCH data, MCCH data, DSI, and MCCH change notification. The MCCH change notification is received over the physical downlink control channel (PDCCH) by the M-RNTI.

The present embodiment provides a communication device, which retrieves broadcast services on one component carrier and the unicast data on the same or a different component carrier, thereby to providing design flexibility and reducing signal interference.

In another embodiment, the communication module 30 receives MBMS from only one of the component carriers 14 and 16 during the RRC idle mode. Communication module 30 comprises a plurality of transmitters and receivers to transmit and receive data services on a plurality of component carriers. Only one receiver corresponding to the MBMS in the communication module 30 is turned on to allow the MBMS data reception. The received MBMS data is stored in the memory module 34, and processed by the control module 32 for playback on the IO module 36.

The present embodiment provides a communication device, which retrieves unicast and broadcast services on one component carrier, thereby reducing power usage.

In yet another embodiment, the component carriers 14 and 16 are identical, i.e., the point-to-multipoint data and the point-to-point data are timely multiplexed and transmitted over first DL CC. The point-to-multipoint data may be MBMS data, and the point-to-point data may be unicast voice data. The communication module 30 receives MBMS data and unicast voice data from the first DL CC (first carrier), and receives RRC signaling such as RRCConnectionReconfiguration to configure the first DL CC and a second DL CC (second carrier) when receiving the MBMS data and the unicast voice data. The MBMS data and the unicast voice data may be stored in the memory module 34. The communication module 30 receives a second configuration to remove the first DL CC. The first and second configuration may be either the same or different configuration files. The control module 32 removes the first DL CC and adds the second DL CC as the new CC according to the received second configuration. Since the first DL CC has been removed, the communication device 3 searches for another MBMS capable cell from the available component carriers. In this embodiment, the control module 32 determines whether the MBMS data is transmitted on the new second CC. If the MBMS data is transmitted on the second CC, the communication module 30 then stops the reception of all data from the first CC and receives the MBMS data and the unicast data from the second component carrier. If the MBMS data is not transmitted on the second CC, the communication module 30 can obtain only the unicast data from the second PCC. In other embodiments, the communication device 3 removes the first DL CC, and adds the second CC and other new CCs, so that the control module 32 can search among the available component carriers for an MBMS service provider to acquire the MBMS service therefrom. The control module 32 processes the MBMS data to play back the multimedia services through the IO module 36, and processes the unicast voice data to play back the phone call through the IO module 36. The IO module 36 may comprise a display screen, a touch screen, a speaker, a microphone, or a keyboard. The communication module 30 may receive control information of the MBMS data only from the second component carrier, or from a point-to-point transmission dedicated thereto, e.g., from RRC signaling. The control information of the MBMS data comprises at least one of the SystemInformationBlockType13 on the BCCH and the MBMS control information on the MCCH. The MBMS data comprises at least one of MTCH data, MCCH data, DSI, and MCCH change notification. The MCCH change notification is received over the physical downlink control channel (PDCCH) by the M-RNTI.

The present embodiment provides a communication device, which retrieves unicast and broadcast services on one component carrier, thereby reducing power usage.

In still another embodiment, the operation of the communication device 3 is identical to the immediately previous embodiment, except that the communication module 30 continues to receive the MBMS data only from the original PCC, rather than searching for another component carrier to provide the MBMS.

The present embodiment provides a communication device to continuously retrieve broadcast services on one component carrier without interruption, thereby providing seamless MBMS data retrieval during the removal of the component carrier by keeping receiving the MBMS data on a component carrier when the component carrier is removed.

Figure 4:
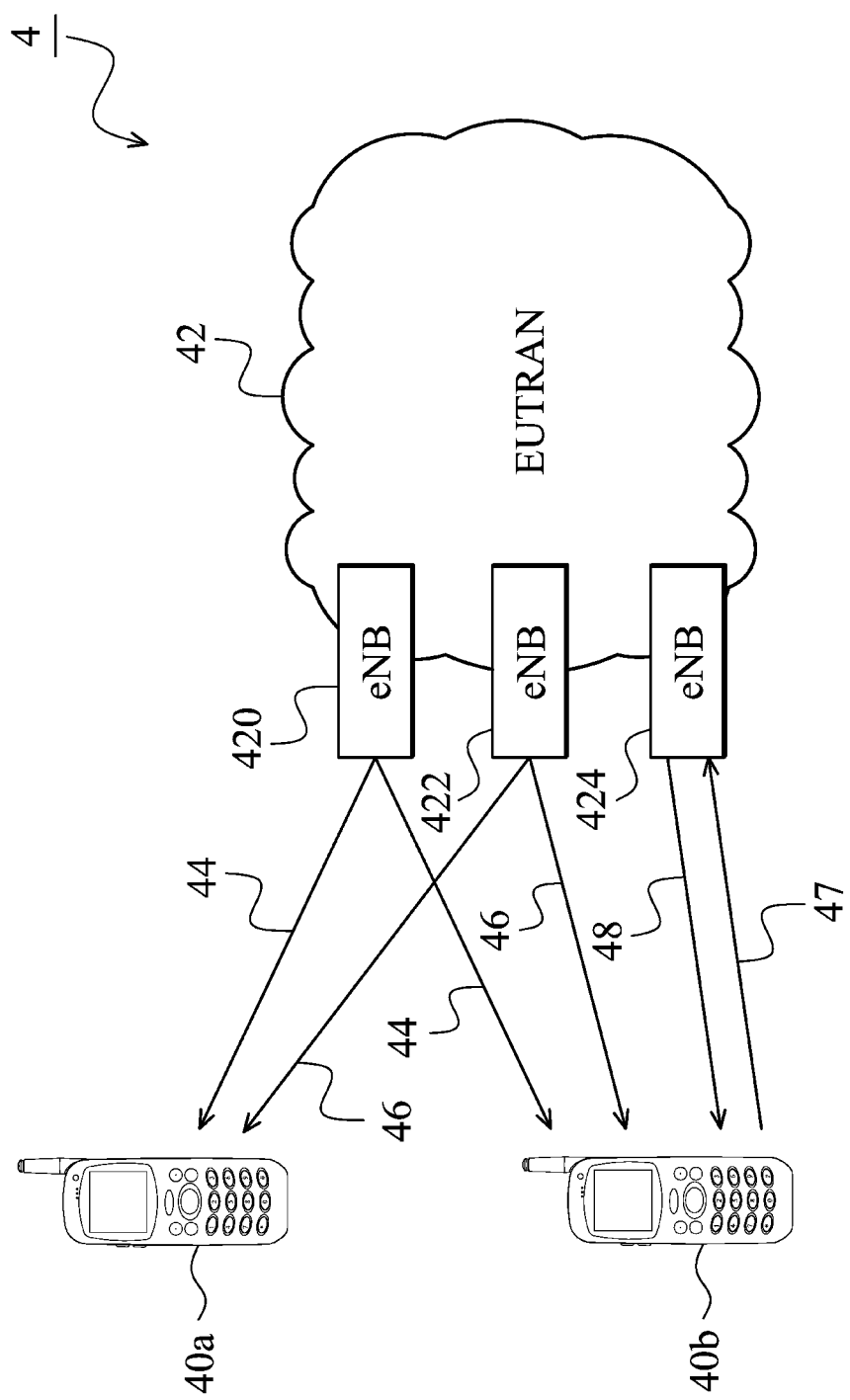
FIG. 4 is a block diagram of an exemplary wireless communication system 4 according to the present invention.

FIG. 4 is a block diagram of an exemplary wireless communication system 4, incorporating a communication device 3 as a communication device 40*a* in accordance with the present invention. The wireless communication system 4 is identical to the wireless communication 1 in FIG. 1, except that the communication device 40*a* is capable of receiving MBMS data from the cells 422 and 420 via multiple component carriers 44 and 46.

The communication module 30 comprises a radio transceiver transmitting to and receiving RF signals from the air. The communication module 30 receives point-to-multipoint data from the first component carrier 44 (first carrier) and the first component carrier 46 (second carrier). The point-to-multipoint data may be MBMS data. The communication module 30 receives the MBMS data of interest according to the DSI periodically broadcasted by the EUTRAN 42. The communication module 30 may receive a configuration of the first and the second component carriers from the component carrier 44 or 46, or from a point-to-point transmission dedicated thereto, e.g., from RRC signaling RRCConnectionReconfiguration. The control module 32 may configure the first and the second component carrier according to the received configuration, thereby receiving unicast data therefrom. The MBMS data and the unicast voice data may be stored in the memory module 34. The communication module 30 may also receive control information of the MBMS data from the component carrier 44 or 46, or from a point-to-point transmission dedicated thereto, for example, RRC signaling RRCConnectionReconfiguration. The control information of the MBMS data comprises at least one of the SystemInformationBlockType13 on the BCCH and the MBMS control information on the MCCH. The MBMS data comprises at least one of MTCH data, MCCH data, dynamic scheduling information (DSI), and an MCCH change notification. The MCCH change notification is received over the physical downlink control channel (PDCCH) by the M-RNTI. The control module 32 configures the carrier components 34 and 36 according to the control information of the MBMS data, processes the MBMS data to play back the multimedia services through the IO module 36, and processes the unicast voice data to play back the phone call through the IO module 36. The IO module 36 may comprise a display screen, a touch screen, a speaker, a microphone, or a keyboard.

The present embodiment provides a communication device, which retrieves broadcast services on more than one component carrier, thereby providing an MBMS data retrieval mechanism for multiple component carriers.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combinations thereof designed to perform the functions described herein. A general purpose processor may be a microprocessor, but as an alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A method for a communication device comprising:
receiving Multimedia Broadcast and Multicast Service (MBMS) data and unicast service data on a first carrier and a second carrier;
receiving a first configuration of the second carrier in a RRCConnectionReconfiguration message received from a network after being configured on the first carrier and the second carrier;
configuring the second carrier as a primary carrier according to the received first configuration; and
stopping the reception of the MBMS data on the first carrier and receiving the MBMS data from the primary carrier when the second carrier is configured as the primary carrier according to the received first configuration in the RRCConnectionReconfiguration message from the network.

2. The method of claim 1, further comprising:
receiving control information of the MBMS data from the first carrier or the primary carrier.

3. The method of claim 1, further comprising:
receiving control information of the MBMS data from a dedicated RRC signaling message.

4. A method for a communication device comprising:
receiving MBMS data on a first carrier;
receiving unicast service data on a second carrier concurrently;
receiving a configuration to remove the first carrier in a RRCConnectionReconfiguration message sent from a network;
removing the first carrier according to the received configuration; and
keeping receiving the MBMS data on the first carrier when the communication device removes the first carrier according to the configuration in the RRCConnectionReconfiguration message sent from the network.

5. The method of claim 4, further comprising:
receiving control information of the MBMS data from the first or the second carrier.

6. The method of claim 4, further comprising:
receiving control information of the MBMS data through a broadcast RRC signaling message or a dedicated RRC signaling message.

7. A communication device, comprising:
a radio frequency (RF) circuit, being configured to receive Multimedia Broadcast and Multicast Service (MBMS) data and unicast service data on a first carrier and a second carrier and receiving a first configuration of the second carrier in a RRCConnectionReconfiguration message received from a network after being configured on the first carrier and the second carrier; and
a control circuit, configuring the second carrier as a primary carrier according to the received first configuration, wherein the control circuit is a processor,
wherein the RF circuit further limits stops the reception of the MBMS data-on the first carrier and receives the MBMS data from the primary carrier when the second carrier is configured as the primary carrier according to the received first configuration in the RRCConnectionReconfiguration message from the network.

8. The communication device of claim 7, wherein the RF circuit further receives control information of the MBMS data from the first carrier or the primary carrier.

9. The communication device of claim 7, wherein the communication RF circuit further receives control information of the MBMS data from a dedicated RRC signaling message.

10. A communication device, comprising:
a communication radio frequency (RF) circuit, receiving MBMS data on a first carrier, receiving unicast service data on a second carrier concurrently and receiving a configuration to remove the first carrier in a RRCConnectionReconfiguration message sent from a network; and
a control circuit, removing the first carrier according to the received configuration, wherein the control circuit is a processor,
wherein the RF circuit keeps receiving the MBMS data on the first carrier when the first carrier is removed according to the configuration in the RRCConnectionReconfiguration message sent from the network.

11. The communication device of claim 10, wherein the RF circuit further receives control information of the MBMS data from the first or the second carrier.

12. The communication device of claim 10, wherein the RF circuit further receives control information of the MBMS data through a broadcast RRC signaling message or a dedicated RRC signaling message.

* * * * *